US008214531B2

United States Patent
Sebastian et al.

(10) Patent No.: US 8,214,531 B2
(45) Date of Patent: Jul. 3, 2012

(54) NETWORK CONFIGURATION SYNCHRONIZATION FOR HARDWARE ACCELERATED NETWORK PROTOCOL

(75) Inventors: Bino J. Sebastian, Marlboro, MA (US); Richard F. Prohaska, Westford, MA (US); James B. Williams, Lowell, MA (US)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 604 days.

(21) Appl. No.: 10/280,503

(22) Filed: Oct. 24, 2002

(65) Prior Publication Data

US 2004/0083308 A1 Apr. 29, 2004

(51) Int. Cl.
*G06F 15/16* (2006.01)
*G06F 11/00* (2006.01)

(52) U.S. Cl. ............................ 709/248; 709/227; 714/12
(58) Field of Classification Search .................. 709/248; 714/12
See application file for complete search history.

(56) References Cited

U.S. PATENT DOCUMENTS

| 5,388,238 | A | 2/1995 | McHarg et al. |
|---|---|---|---|
| 5,504,899 | A | 4/1996 | Raz |
| 5,513,126 | A | 4/1996 | Harkins et al. |
| 5,761,444 | A | 6/1998 | Ajanovic et al. |
| 5,860,119 | A | 1/1999 | Dockser |
| 5,870,567 | A | 2/1999 | Hausauer et al. |
| 6,044,368 | A | 3/2000 | Powers et al. |
| 6,826,615 | B2 * | 11/2004 | Barrall et al. ................. 709/227 |

OTHER PUBLICATIONS

Emulex Product Reference Guide, Jun. 2002, Costa Mesa, CA.
Emulex Web Page: "GN9000/V 1 Gb/s VI/IP © PCI Host Bus Adapter" Features and Description, 2001.
Emulex Web Page: Press Release—"Emulex HBA Selected by Network Appliance for First DAFS-Based Database Storage Solution," Apr. 3, 2002, Costa Mesa, CA.
"SANPower I Solutions," www.bellmicro.com/SANPower/sanpowerI/product_showcase.htm, Feb. 25, 2002.
"The Critical Role of a Host Bus Adaptor (HBA in Storage Area Networks," Emulex Technology Brief, Apr. 2001.
"Storage Area Networking with Fibre Channel," www.emulex.com/products/white/fc/san.html, Feb. 25, 2002.
"Single Server Storage Configuration," www.emulex.com/intel/1_jbod.html, Feb. 25, 2002.
Ajay V. Bhatt, "Creating a Third Generation I/O Interconnect".
"How IDE Controllers Work," www.howstuffworks.com/ide2.htm, Apr. 27, 2002.
"Comparative I/O Positioning," Mellanox Technologies, www.mellanox.com/products.
"iSCSI Storage over IP," IBM.com/storage.
"How PCI Works," www.howstuffworks.com/pci1.htm, Apr. 17, 2002.
"PCI-X Addendum to the PCI Local Bus Specification," PCI Special Interest Group, Jul. 24, 2000.

* cited by examiner

*Primary Examiner* — Peling Shaw
(74) *Attorney, Agent, or Firm* — Morrison & Foerster LLP

(57) ABSTRACT

Systems and techniques to synchronize network configuration for a hardware accelerated network protocol. According to an aspect, a network configuration record is maintained for a hardware-accelerated network-protocol device, a network configuration store is monitored to identify a network configuration change, and the hardware-accelerated network-protocol device is reconfigured, in response to the identified network configuration change, based on the network configuration record and the network configuration change.

20 Claims, 5 Drawing Sheets

NETWORK CONFIGURATION SYNCHRONIZATION FOR HARDWARE ACCELERATED NETWORK PROTOCOL

BACKGROUND

The present application describes systems and techniques relating to configuring a network stack, for example, configuring a network stack used by networking hardware.

Typical hardware accelerated TCP/IP (Transmission Control Protocol/Internet Protocol) provides a traditional network interface through a network driver and an accelerated TCP/IP interface through a TCP/IP acceleration driver. In the traditional network path, the TCP/IP stack is executed in the kernel of the host operating system (OS). This host OS typically provides a set of commands that can be used to configure the network interface and the host TCP/IP stack. Additionally, the TCP/IP acceleration hardware can be configured by a user changing configuration definitions in a file or fixed memory location.

SUMMARY

The present application teaches network configuration synchronization for a hardware accelerated network protocol. According to an aspect, a network configuration record is maintained for a hardware-accelerated network-protocol device, a network configuration store is monitored to identify a network configuration change, and the hardware-accelerated network-protocol device is reconfigured, in response to the identified network configuration change, based on the network configuration record and the network configuration change.

Details of one or more implementations are set forth in the accompanying drawings and the description below. Other features and advantages may be apparent from the description and drawings, and from the claims.

DRAWING DESCRIPTIONS

DETAILED DESCRIPTION

The present application describes systems and techniques relating to network configuration synchronization for a hardware accelerated network protocol.

Figure 1:
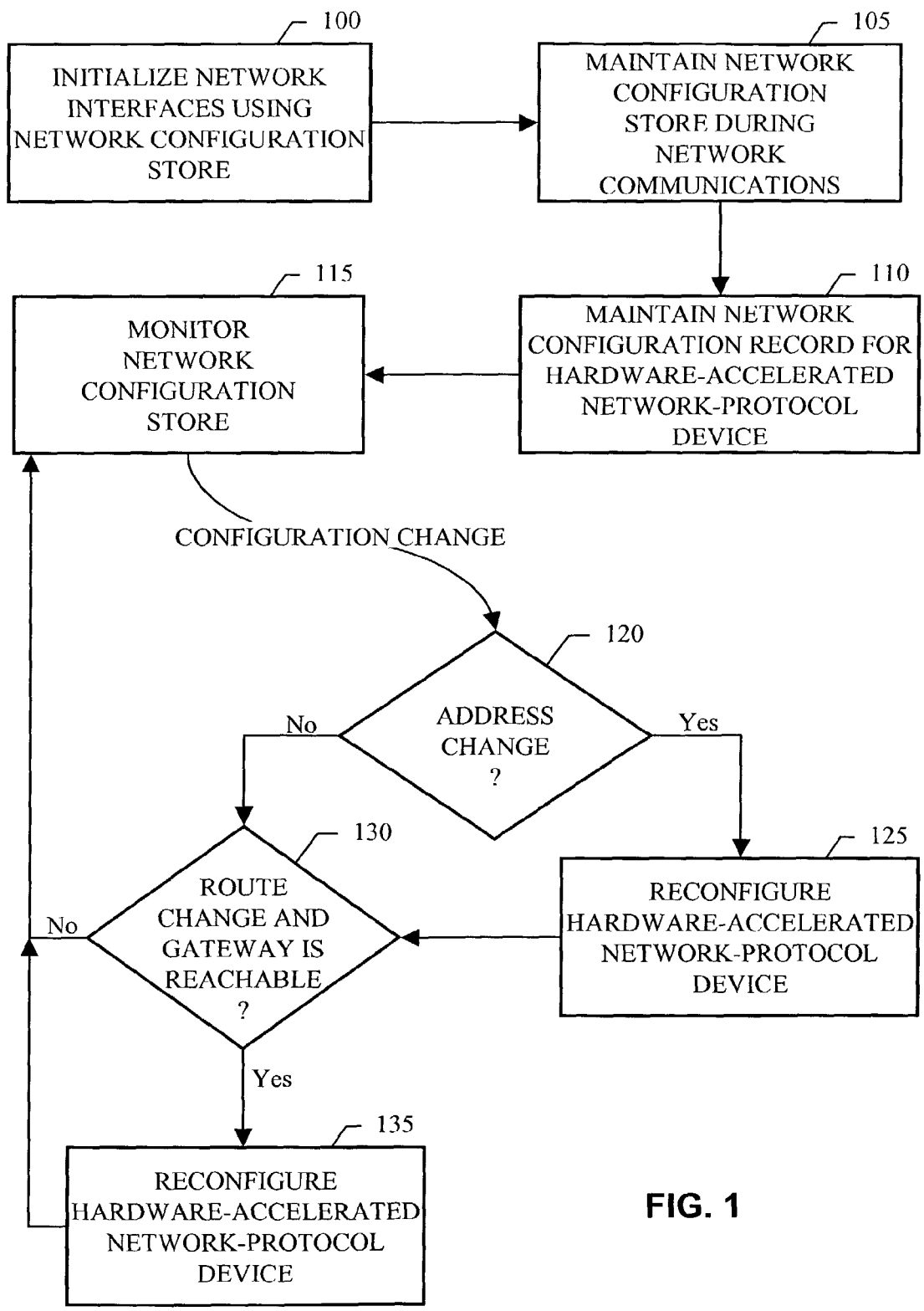
FIG. 1 is a flowchart illustrating network configuration synchronization for a hardware-accelerated network-protocol device.

FIG. 1 is a flowchart illustrating network configuration synchronization for a hardware-accelerated network-protocol device. Network interfaces can be initialized using a network configuration store at 100. For example, a network host can include a TCP/IP stack that has a static network configuration database, which is used by the host OS to initialize the host's network interfaces, including an accelerated TCP/IP interface through a TCP/IP acceleration driver.

A network configuration store is maintained during network communications at 105. The network configuration store can be a dynamic database of network configuration and may be part of a larger database that includes a static network configuration database used for initialization. The network configuration store may be maintained by an OS, such as by updating the network configuration store with current network configuration information based on changes caused by one or more routing protocol daemons and/or received network configuration commands. The network configuration store may be a preexisting component of the OS.

A configuration record for a hardware-accelerated network-protocol device is maintained at 110. A node agent may keep a local copy of network addresses and route tables for multiple accelerator devices in a system. When changes to the network configuration handled by the OS occur, the accelerator devices can be reconfigured as needed, and the network addresses and route tables can be updated accordingly in the configuration record.

The network configuration store is monitored at 115. A message-based interface can be used with the network configuration store to identify a network configuration change. When a configuration change occurs, a check is made to determine if address information has changed at 120. The check may be to determine if a local cached IP address or network address is different from the host network configuration. If so, the hardware-accelerated network-protocol device is reconfigured, such as by updating IP address information in the device, at 125. The network configuration record can also be updated at 125.

Next, a check is made to determine if routing information has changed at 130. The check may be to determine if a local cached routing table is different from the host routing table, and if the gateway of the route entry is reachable through the network interface. If so, the hardware-accelerated network-protocol device is reconfigured, such as by updating the IP route entry in the device, at 135. The network configuration record can also be updated at 135.

Moreover, the checks for network configuration changes, and the device reconfigurations, can be performed for multiple hardware-accelerated network-protocol devices after a configuration change occurs. After the automatic reconfiguration of the hardware-accelerated network-protocol device(s), monitoring of the network configuration store continues at 115.

Figure 2:
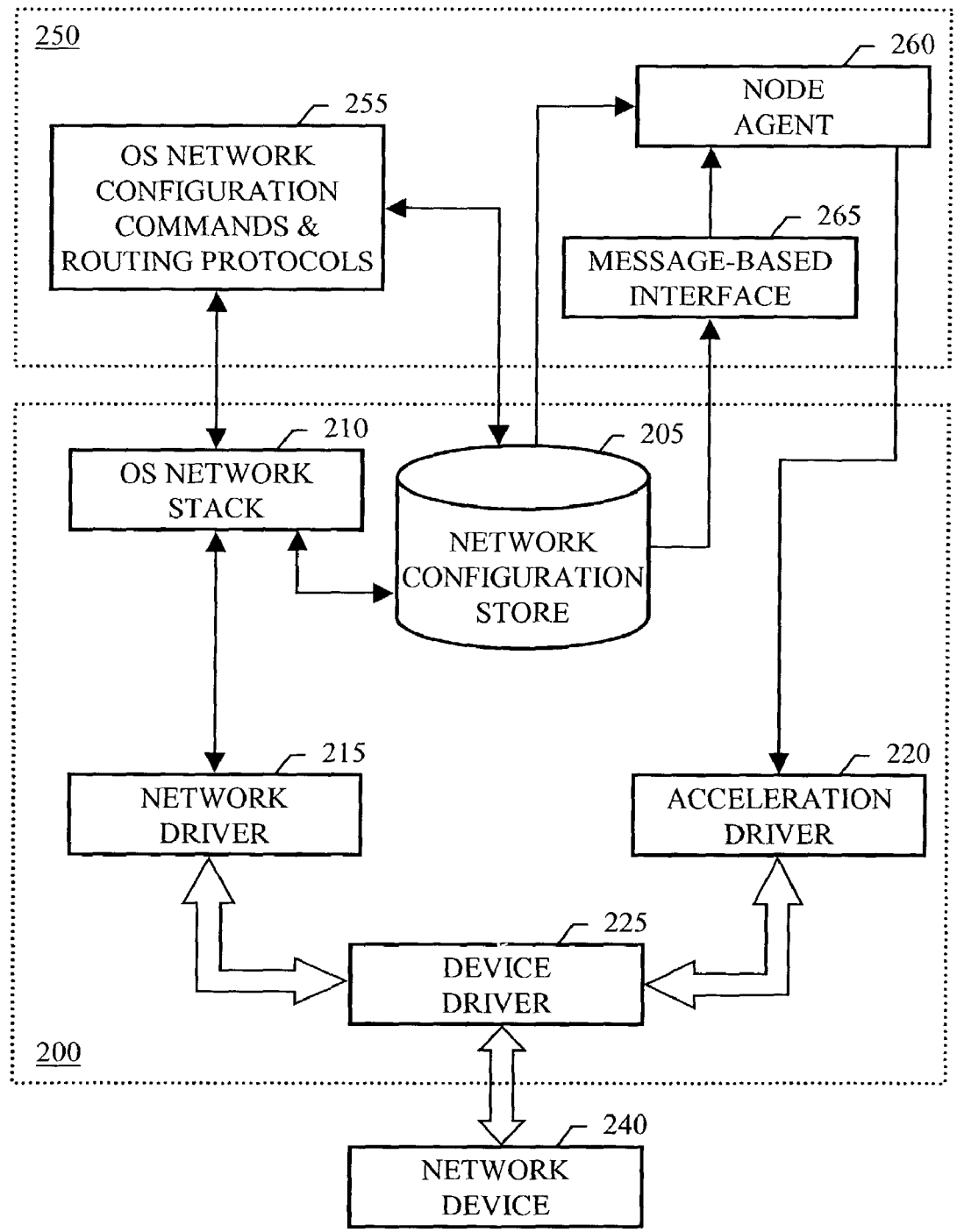
FIG. 2 is a block diagram illustrating components and operational interactions for a system implementing network configuration synchronization for a hardware-accelerated network-protocol device.

FIG. 2 is a block diagram illustrating components and operational interactions for a system implementing network configuration synchronization for a hardware-accelerated network-protocol device. The components can be implemented in hardware, software, firmware or combinations of these. In one implementation, some of the components are split between a kernel space 200 and an application layer 250 in a processing system, such as a network host.

At least two network paths are provided. A first network path provides a network interface through an OS network stack 210 and a network driver 215. In this first network path, the network stack (e.g., a TCP/IP stack) can be processed in the kernel 200 of the OS. One or more components 255 provide OS network configuration commands and routing protocol programs (e.g., routed, gated, BGP (Border Gateway Protocol) daemon). The OS can provide a set of commands to configure the first network interface and the network stack. The routing protocol programs can be used by the OS to discover network topology and detect network topology changes and to configure the network stack accordingly.

For example, in many TCP/IP systems, routing protocols are implemented as user level daemons (processes). These processes listen to their routing protocol transport endpoints for routing information changes. When there is a change in the routing information in the network (e.g., due to a network topology change), new routing information is sent to routing protocol daemons on the network nodes, which are affected by the routing information change. When these routing protocol daemons receive routing protocol messages, they reconfigure the host TCP/IP stack with the new information. This causes a change in the operating system's network configuration store and generates route socket messages.

A second network path provides a network interface through an acceleration driver 220. In this second network path, a portion of network stack processing is performed in a network device 240, which is a hardware-accelerated network-protocol device. The network device 240 may handle data in the first network path in addition to data in the second network path, and may be driven by a device driver 225.

The network device 240 may include TCP/IP acceleration hardware. As used herein, the terms "accelerator hardware" and "acceleration hardware" refer to a network communication accelerator component of a device. This component may include both hardware and firmware. The network device 240 may be any network device that handles at least partial network stack processing offload from the main processing system. The network device 240 need not have a completely separate and independent protocol stack (e.g., the network device 240 need not have its own IP address). For example, the network device 240 can be a host bus adapter (HBA), a network interface card (NIC), a network file system (NFS) accelerator product, a remote direct memory access (RDMA) bufferless NIC, and/or a TCP offload engine.

A hardware accelerated network stack, which is running on the network device 240, is automatically updated with new configuration information whenever there is a change in the system's network configuration. Reconfiguration of the network device 240 involves setting of address and routing information using a provided device interface. In a TCP/IP implementation, a typical TCP/IP stack needs configuration information as follows: (1) IP address; (2) network address and subnet mask; and (3) one or more route entries, including destination network, destination network mask, and gateway IP address.

Changes in network topology can be represented using a change in network configuration parameters, such as described above, and the network device 240 can be reconfigured in response to topology changes using the device interface and the configuration information. Thus, in a TCP/IP implementation, the network device 240 can provide an interface to the TCP/IP acceleration hardware as follows: (1) delete an IP address assigned to hardware TCP/IP stack; (2) add an IP address to the hardware TCP/IP stack (e.g., adding a 3tuple: <IP address, Subnet address, Network mask>); (3) delete all IP addresses assigned to the hardware TCP/IP stack; (4) add a route table entry to the hardware TCP/IP stack; and (5) delete a route table entry from the hardware TCP/IP stack.

The OS maintains a network configuration store 205, such as a dynamic database of network configuration information. Routing protocol daemons and user commands for configuring the first network interface update the network configuration store 205. The OS may provide two types of interfaces to the network configuration store 205: (1) A message-based interface 265, such as route socket (an application can listen on a route socket to receive messages when a network configuration parameter is updated); and (2) A query interface (an application can use this interface to query any network configuration parameter).

A node agent 260 uses the message-based interface 265 to monitor the network configuration store 205 and identify network configuration changes. The node agent 260 may keep a local copy of address information and route tables for one or more accelerator devices present in the system. The node agent 260 receives messages from the message-based interface 265, determines which of the one or more accelerator devices needs to be reconfigured, and reconfigures those device(s).

For example, in a TCP/IP implementation, the node agent 260 may open a route socket and listen to the socket. When the node agent 260 receives a network configuration change message, the node agent 260 may perform a series of operations for the TCP/IP accelerator hardware in the system. First, if the local cached IP address or network address is different from the system network configuration, the TCP/IP accelerator hardware is updated (e.g., update the configuration in the device firmware). Second, if the local cached routing table is different from the system routing table, the route entry is updated in the hardware if the gateway of the route entry is reachable through the network interface. Thus, the network configuration for one or more TCP/IP accelerator devices can be automatically synchronized with the network configuration of the system.

The systems and techniques described above can be used when the same network address is used for a traditional network interface and a hardware accelerated interface. In such a case, when a connection is established, the application uses the hardware accelerated interface for specific types of transport end points, and the application uses the traditional network interface for all other transport endpoints. In this scenario, it is important for the traditional network interface to not use transport endpoints reserved for the hardware-accelerated connections. The node agent binding to the transport endpoints reserved for the hardware-accelerated connections can be used to enforce this.

The systems and techniques described above can be implemented in different types of data processing systems to synchronize network configurations for different types of hardware-accelerated network-protocol devices.

Figure 3:
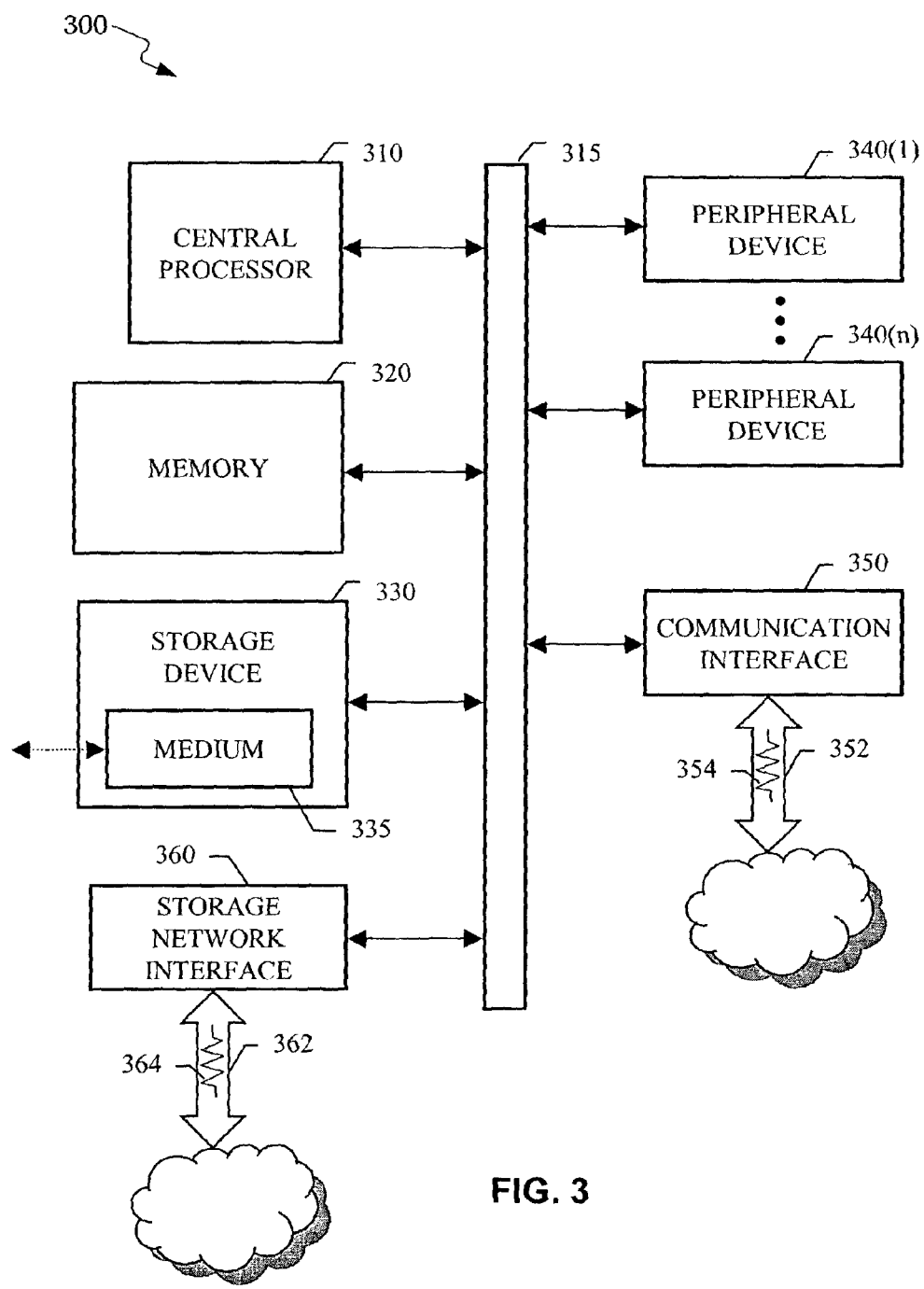
FIG. 3 is a block diagram illustrating an example data processing system.

FIG. 3 is a block diagram illustrating an example data processing system 300. The data processing system 300 includes a central processor 310, which executes programs, performs data manipulations and controls tasks in the system 300. The central processor 310 can include multiple processors or processing units and can be housed in a single chip (e.g., a microprocessor or microcontroller) or in multiple chips using one or more printed circuit boards and/or other inter-processor communication links (i.e., two or more discrete processors making up a multiple processor system).

The central processor 310 is coupled with a system-interconnect bus 315. The system-interconnect bus 315 provides one or more pathways through which data is transmitted among portions of the system 300. The system-interconnect bus 315 can include multiple separate busses, which can be parallel and/or serial busses, bus interfaces, and/or bus bridges. Each bus may have an address bus and a data bus. The system-interconnect bus 315 can include one or more system-interconnect bus architectures (e.g., Peripheral Component Interconnect (PCI), PCI-X, industry standard architecture (ISA), extended ISA (EISA), Accelerated Graphics Port (AGP), Universal Serial Bus (USB), SCSI (Small Computer System Interface), future bus architectures).

The data processing system 300 includes a memory 320, which is coupled with the system-interconnect bus 315. The system 300 can also include one or more cache memories. These memory devices enable storage of instructions and data close to the central processor 310 for retrieval and execution.

The memory 320 can include a non-volatile memory and a volatile memory. For example, a non-volatile memory can be used to store system firmware, which can be used to handle initialization of the data processing system 300 and loading of an operating system (OS), such as Windows® 2000, provided by Microsoft Corporation, located at One Microsoft Way Redmond Wash. 98052-6399, Solarise 8, provided by Sun Microsystems, Inc., located at 901 San Antonio Road Palo Alto Calif. 94303, or Linux, a freely-distributable open source implementation of UNIX. The volatile memory, which requires a steady flow of electricity to maintain stored data, can be used to store instructions and data once the system 300 starts up.

The data processing system 300 can include a storage device 330 for accessing a medium 335, which is a machine-readable medium containing machine instructions, such as instructions for causing the system 300 or components of the system 300 to perform operations. The medium 335 can be removable and can include a boot media having OS instructions and data that are loaded into the volatile memory when the system 300 boots up. The medium 335 can be read-only or read/write media and can be magnetic-based, optical-based, semiconductor-based media, or a combination of these. Examples of the storage 330 and the medium 335 include a hard disk drive and hard disk platters, which may be removable, a floppy disk drive and floppy disk, a tape drive and tape, and an optical disc drive and optical disc (e.g., laser disk, compact disc, digital versatile disk).

The data processing system 300 can also include one or more peripheral devices 340(1)-340(n) (collectively, devices 340), and one or more controllers and/or adapters for providing interface functions. The devices 340 can be additional storage devices and media as described above, other storage interfaces and storage units, adaptors, input devices and/or output devices. For example, the system 300 can include a display system having a display device (e.g., a video display adapter having components for driving a display, including video random access memory (VRAM), buffer, and graphics engine).

The system 300 also includes a communication interface 350, which allows software and data to be transferred, in the form of signals 354, between the system 300 and external devices, networks or information sources. The signals 354 can be any signals (e.g., electronic, electromagnetic, optical) capable of being received on a channel 352 (e.g., wire, cable, optical fiber, phone line, infrared (IR) channel, radio frequency (RF) channel, etc.). The signals 354 can embody instructions for causing the system 300 or components of the system 300 to perform operations.

The communication interface 350 can be a communications port, a telephone modem or wireless modem. The communication interface 350 can be a network interface card (e.g., an Ethernet card connected with an Ethernet Hub), and may be designed for a particular type of network, protocol and channel medium, or may be designed to serve multiple networks, protocols and/or channel media. Moreover, the communication interface 350 may provide network stack processing offload for the central processor 310.

Additionally, the system 300 can include a storage network interface 360, which allows software and data to be transferred, in the form of signals 364, between the system 300 and a storage area network. The signals 364 can be any signals, such as the signals 354, capable of being transmitted and received on a channel 362. The signals 364 can embody instructions for causing the system 300 or components of the system 300, such as the storage network interface 360, to perform operations.

The storage network interface 360 may provide network stack processing offload for the central processor 310 and may support the Virtual Interface architecture over IP (VI/IP). The storage network interface 360 can be a host bus adapter, such as shown and described in connection with FIG. 4 below.

When viewed as a whole, the system 300 is a programmable machine. Example machines represented by the system 300 include a server (e.g., a network host) a personal computer, a mainframe, and a supercomputer. The machine 300 can include various devices such as embedded controllers, Programmable Logic Devices (PLDs) (e.g., PROM (Programmable Read Only Memory), PLA (Programmable Logic Array), GAL/PAL (Generic Array Logic/Programmable Array Logic)), Field Programmable Gate Arrays (FPGAs), ASICs (application specific integrated circuits), single-chip computers, smart cards, or the like.

Machine instructions (also known as programs, software, software applications or code) can be stored in the machine 300, in a storage area network coupled with the storage network interface 360, and/or delivered to the machine 300 over a communication interface. These instructions, when executed, enable the machine 300 to perform features and function described above. These instructions represent controllers of the machine 300 and can be implemented in a high-level procedural and/or object-oriented programming language, and/or in assembly/machine language. Such languages may be compiled and/or interpreted languages.

As used herein, the term "machine-readable medium" refers to any computer program product, apparatus and/or device used to provide information indicative of machine instructions and/or data to the machine 300, including a machine-readable medium that receives machine instruction as a machine-readable signal. Examples of a machine-readable medium include the medium 335, the memory 320, and/or PLDs, FPGAs, ASICs, and the like. The term "machine-readable signal" refers to any signal, such as the signals 354, used to provide machine instructions and/or data to the machine 300.

Figure 4:
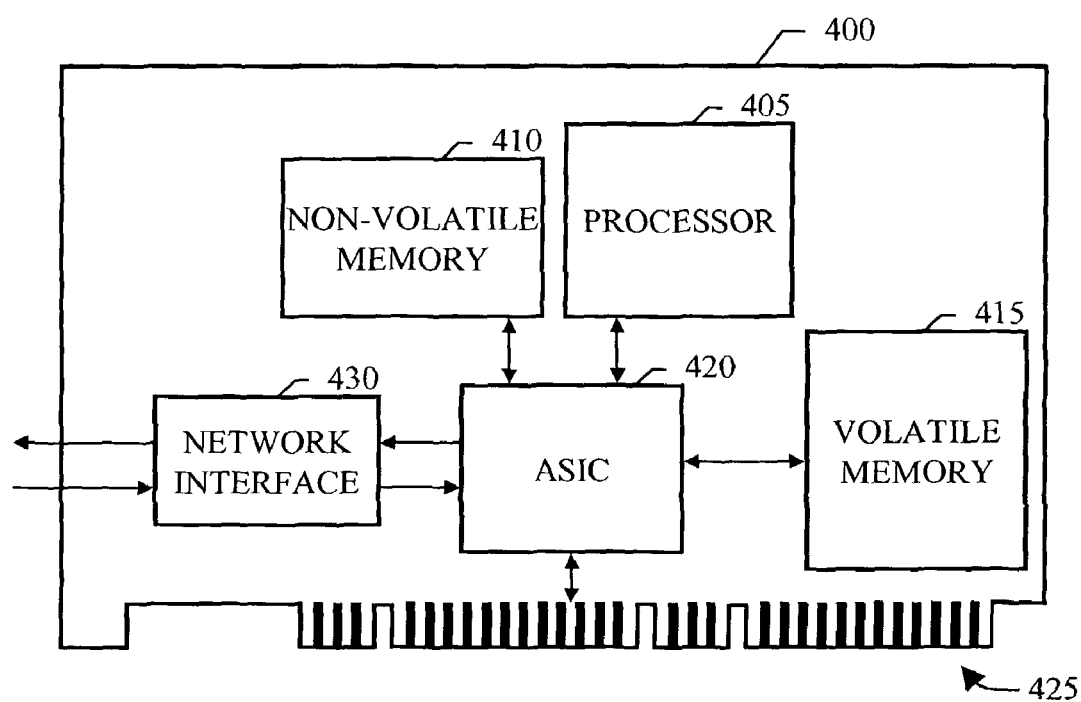
FIG. 4 is a block diagram illustrating a host bus adapter card according to one implementation.

FIG. 4 is a block diagram illustrating a host bus adapter card 400 according to one implementation. The host bus adapter card 400 is configured to be inserted into an existing processing system to provide an interface to a storage area network, providing block-level Input/Output (I/O) services. The host bus adapter 400 includes a processor 405, which can be an SA-110 StrongARM processor, provided by Intel Corporation, located at 2200 Mission College Boulevard Santa Clara Calif. 95052-8119.

The host bus adapter 400 also includes a non-volatile memory 410 and a volatile memory 415. The non-volatile memory 410 may be a flash memory. The volatile memory 415 may be a high-speed SRAM (Static Random Access Memory)-based memory device, such as a QDR (Quad Data Rate) SRAM with a dedicated read port and a dedicated write port. The volatile memory 415 may be used to store transmit and receive payload data as well as to store network and bus context information and processor data (e.g., code, stack and scratch data).

The host bus adapter 400 also includes a bus adapter ASIC 420. This bus adapter ASIC 420 connects the processor 405, the non-volatile memory 410 and the volatile memory 415 with a system-interconnect bus interface 425 and a network interface 430. The bus adapter ASIC 420 may be implemented using various circuitry components, including random access memory, multiple first-in-first-out (FIFO) memories, including dedicated management circuitry for the FIFO memories, a DMA (Direct Memory Access) arbitrator, which controls access to the system-interconnect bus interface 425, a register bus, and a controller for coordinating and orchestrating the activity of the ASIC 420.

Moreover, the ASIC 420 can be made to emulate the designs of multiple manufactures to improve interoperability with various components to be connected to the host bus adapter 400. For example, the host bus adapter 400 can be made to support multiple OS/platforms. The system-interconnect bus interface 425 can be configured to connect with a parallel bus, such as a PCI-X bus. The network interface 430 can be configured to connect with a defined network, such as a Fibre Channel network or a gigabit Ethernet network.

The bus adapter shown and described above in connection with FIG. 4 is presented as example only. Other bus adapters, as well as entirely different devices, may use the systems and techniques described here.

In general, a bus adapter provides I/O processing and physical connectivity between a data processing system, such as a server, and storage. The storage can be attached using a variety of direct attached or storage networking technologies, such as Fibre Channel, iSCSI (Small Computer System Interface over Internet Protocol), VI/IP, FICON (Fiber Connection), or SCSI. In the example host bus adapter shown and described in connection with FIG. 4, the host bus adapter includes a processor, a protocol controller ASIC, and buffer memory to maintain data flow. This host bus adapter takes block-level data from a parallel I/O channel (e.g., PCI-X) and maps it to a routable protocol (e.g., TCP/IP over Ethernet).

The host bus adapter can be the network device from FIG. 2. This device can provide a direct path between a VI-enabled application and the network, bypassing compute intensive operating system protocol processing routines. When used in connection with the network configuration synchronization systems and techniques, the result can be an easily maintained storage area network (SAN) interface that provides maximum throughput, low latency, and reduced CPU overhead when processing application, database and/or file system communications.

Figure 5:
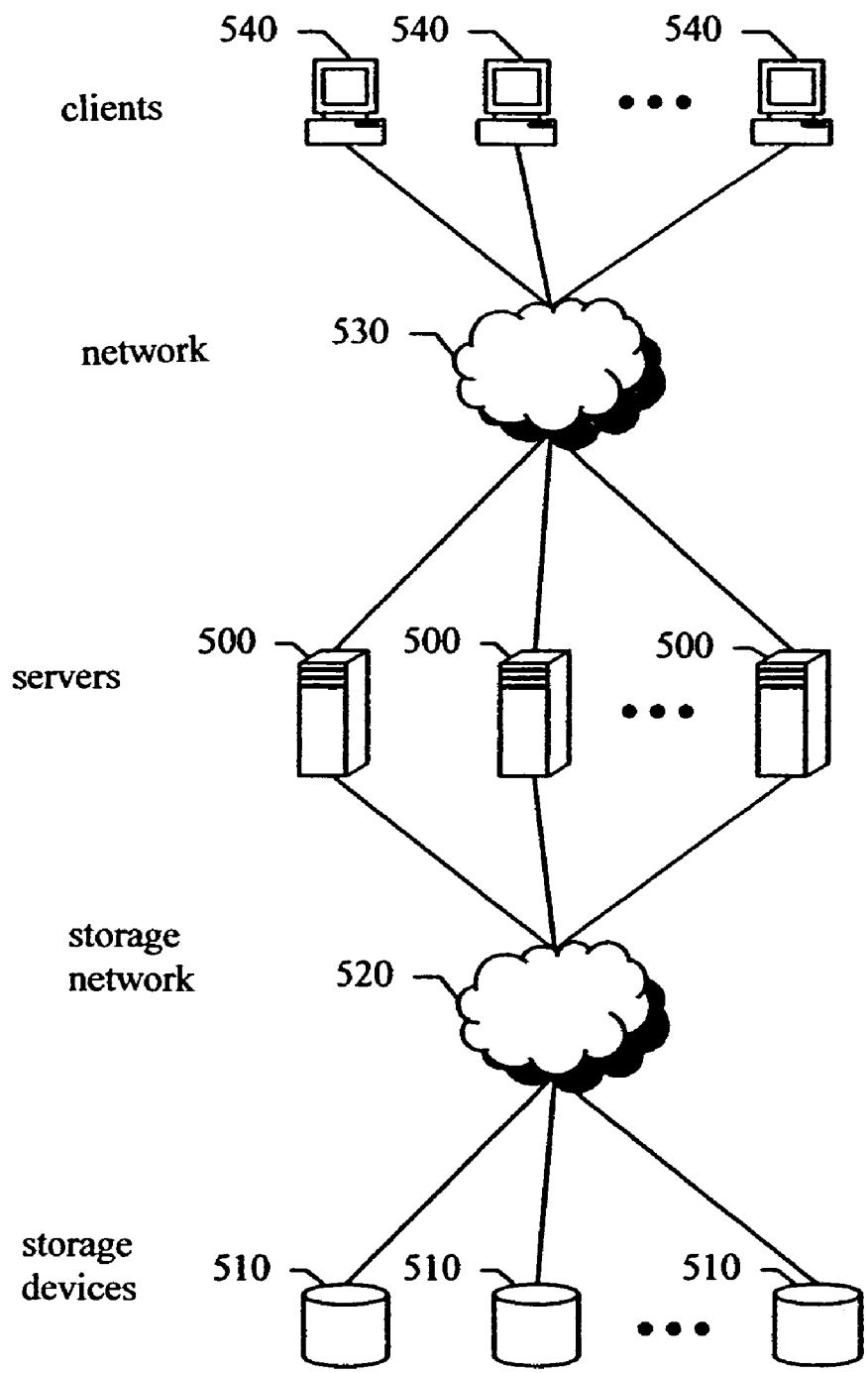
FIG. 5 is a block diagram illustrating an operational environment for an automatic network configuration synchronization system according to one implementation.

FIG. 5 is a block diagram illustrating an operational environment for an automatic network configuration synchronization system according to one implementation. Multiple servers 500 are connected with a storage area network. A server 500 can be implemented in the manner shown and described above. A server 500 can be an Intel®-based system, such as an Intel® AC450NX System with four 550-MHz Pentium® III Xeon™ processors and 1 GB (Gigabyte) RAM, or an Intel® OCPRF100 System with eight 550 MHz Pentium® III Xeon™ processors and 1 GB RAM.

The storage area network includes multiple storage devices 510 and a storage network 520. The storage network 520 can be a high-speed network dedicated to data storage. For example, the storage network 520 can be an IP network using gigabit Ethernet transport, or a Fibre Channel network, such as a Fibre Channel Arbitrated Loop or a Fibre Channel Switched Fabric. Each storage device 510 can be a storage array using SCSI, PCI-X or other bus architecture, JBOD (Just a Bunch of Disks), a RAID (Redundant Array of Inexpensive Disks) enclosure, or other mass storage device. In general, a storage device 510 includes at least one machine-readable medium as defined above, and the storage area network provides block-level I/O access to the shared storage devices 510 for the servers 500.

Servers 500 are connected with a network 530, which can include multiple machine networks, such as Ethernet networks, IP networks, and/or ATM (Asynchronous Transfer Mode) networks. The network 530 can be a private network, a virtual private network, an enterprise network, a public network, and/or the Internet. The network 530 provides a communication link between multiple clients 540 and the servers 500.

Various implementations of the systems and techniques described here can be realized in digital electronic circuitry, integrated circuitry, specially designed ASICs, computer hardware, firmware, software, and/or combinations thereof. The various implementations described above have been presented by way of example only, and not limitation. Other systems, architectures, and modifications and/or reconfigurations of devices, machines and systems shown are also possible.

Other embodiments may be within the scope of the following claims.

What is claimed is:

1. A method for updating network configuration of an accelerated hardware of a processing system, the method comprising:

providing a first bidirectional network processing path comprising a OS network stack, the first bidirectional network processing path having a first network configuration and adapted to provide a first network interface for the processing system;

providing a second bidirectional network processing path comprising the accelerated hardware, the second bidirectional network processing path having a second network configuration and adapted to provide a second network interface for the processing system;

detecting a network topology change;

updating the first network configuration of the first bidirectional network processing path in response to the network topology change by reconfiguring the OS network stack;

updating a network configuration store in response to changes to the first network configuration of the first bidirectional network processing path, the network configuration store being a part of the processing system; and updating the second network configuration in response to changes in the network configuration store by reconfiguring the accelerated hardware.

2. The method of claim 1, wherein updating the network configuration store is in response to changes caused by a routing protocol daemon.

3. The method of claim 1, updating the second network configuration further comprising monitoring the network configuration store using the node agent and determining whether the accelerated hardware is to be reconfigured.

4. The method of claim 3, wherein monitoring a network configuration store comprises using a message-based interface to the network configuration store.

5. The method of claim 1, wherein updating the second network configuration comprises:

updating address information in the accelerated hardware if the network configuration record indicates a change to address information; and updating routing information in the accelerated hardware if the network configuration record indicates a change to routing information.

6. The method of claim 5, wherein the accelerated hardware is a part of a bus adapter.

7. The method of claim 1, wherein the second network configuration is maintained in a node agent separate from the network configuration store.

8. The method of claim 7, wherein updating the second network configuration further comprises reconfiguring the accelerated hardware by the node agent.

9. A machine-readable storage device comprising instructions when loaded into a volatile memory and executed by a processor causing a machine to perform operations comprising:
    detecting a network topology change;
    updating a first network configuration of a first bidirectional network processing path in response to the network topology change by reconfiguring an OS network stack of the first bidirectional network processing path, the first bidirectional network processing path adapted to provide a first network interface for the machine;
    updating a network configuration store in response to changes to the first network configuration of the first bidirectional network processing path, the network configuration store being a part of the machine; and
    updating a second network configuration of a second bidirectional network processing path in response to changes in the network configuration store by reconfiguring accelerated hardware of the second bidirectional network processing path, the second bidirectional network processing path adapted to provide a second network interface for the machine.

10. The machine-readable storage device of claim 9, updating the second network configuration further comprising monitoring the network configuration store using the node agent and determining whether the accelerated hardware is to be reconfigured.

11. The machine-readable storage device of claim 10, wherein monitoring a network configuration store comprises using a message-based interface to the network configuration store.

12. The machine-readable storage device of claim 9, wherein updating the second network configuration comprises:
    updating address information in the accelerated hardware if the network configuration record indicates a change to address information; and
    updating routing information in the accelerated hardware if the network configuration record indicates a change to routing information.

13. The machine-readable storage device of claim 9, wherein the second network configuration is maintained in a node agent separate from the network configuration store.

14. The machine-readable storage device of claim 13, wherein updating the second network configuration further comprises reconfiguring the accelerated hardware by the node agent.

15. A system comprising:
    a storage area network;
    a bus adapter coupled with a parallel bus and with the storage area network, the bus adapter including an accelerated hardware; and
    a programmable machine including the parallel bus, one or more software networking utilities, an operating system adapted to detect network topology changes and configure the one or more software networking utilities in response to the detected network topology changes, a network configuration store maintained by the operating system and reflecting a configuration of the one or more software networking utilities, and a node agent separate from the network configuration store and operable to monitor the network configuration store and update a configuration of the accelerated hardware in response to a change in the network configuration store,
    wherein the software networking utilities included in the programmable machine are part of a first bidirectional network processing path; and the accelerated hardware in the bus adapter is part of a second bidirectional network processing path.

16. The system of claim 15, wherein the accelerated hardware is a TCP/IP accelerator hardware, wherein the node agent opens a route socket to monitor changes in the network configuration store and performs operations for a TCP/IP accelerator hardware in response to the changes.

17. The system of claim 15, wherein the bus adapter comprises a host bus adapter card.

18. The system of claim 17, wherein the parallel bus conforms to a Peripheral Component Interconnect Extended bus standard.

19. A network host comprising:
    means for detecting a network topology change;
    means for updating a first network configuration of a first bidirectional network processing path in response to the network topology change by reconfiguring an OS network stack of the first bidirectional network processing path, the first bidirectional network processing path adapted to provide a first network interface for the machine;
    means for updating a network configuration store in response to changes to the first network configuration of the first bidirectional network processing path, the network configuration store being a part of the machine; and
    means for updating a second network configuration of a second bidirectional network processing path in response to changes in the network configuration store by reconfiguring accelerated hardware of the second bidirectional network processing path, the second bidirectional network adapted to provide a second network interface for the machine.

20. The network host of claim 19, wherein the accelerated hardware is a part of a network device comprising a bus adapter implementing VI/IP over a TCP/IP network.

* * * * *